UNITED STATES PATENT OFFICE 2,322,689

CHEMICAL PROCESS FOR PRODUCTION OF POTABLE WATER FROM NONPOTABLE SALINE WATER

Alexander Goetz, Pasadena, Calif., assignor to Sunshine Mining Company, Yakima, Wash., a corporation No Drawing. Application August 4, 1942, Serial No. 453,596

18 Claims. (Cl. 210—23)

My invention pertains to a chemical process for production of potable water from non-potable saline waters. The invention relates more particularly to the production of a potable water from sea water by a method involving chemical desalination of the sea water in respect to the salts originally contained therein which are responsible for its non-potability.

It has long been the practice to subject sea water and other saline waters to distillation for the production of a potable water as the distillate or for the recovery of the residue salts or for both purposes. It has also long been the practice to subject saline waters, more particularly more or less concentrated waste brines from certain mining operations, paper manufacturing operations and the like, to chemical treatment, as distinguished from distillation, solely for selective recovery therefrom of some one or more of the contained alkali and alkaline earth metals or their salts, and in some instances for the recovery of bromine or iodine or some halide compound from brines containing them. Also, it has less frequently been a prior art practice to subject various saline waters to both chemical and distillation treatments for selective recovery of the desired metals or their salts by the chemical treatment while still enabling the production of a potable water by a final distillation treatment.

So far as I am aware, however, none of such prior art chemical treatments alone, without the use of a distillation step, has been suitable for the production of a potable water from the non-potable brine or other saline water. Moreover, such prior methods of treating saline waters, whether for the production of a potable water or recovery of its contained metals or salts, or both, usually require expertly manufactured, cumbersome and expensive apparatus, as in the case of the stills employed in the distillation method in particular; and, also, for the chemical methods, relatively large separate supplies of chemical reagents and expert knowledge of and accuracy in the chemical procedures.

Accordingly, a general object of my invention is to provide a chemical process for production of potable water from various saline waters without the employment of a distillation step and requiring the use of only a few chemical reagents in small quantities which may be compactly stored in relatively small containers ready for immediate use, usually requiring not more than two such containers, and requiring only simple and readily improvised apparatus and no expert knowledge of or accuracy in the chemical procedures.

A more particular object of my invention is to provide such a chemical process as last outlined above for its especial suitability of use in the production of potable water from sea water by ship-wrecked persons on life rafts and the like as a protection against suffering or death by thirst through lack of potable water, as, obviously, in such a situation stills are not available nor could the situation be met by any chemical method requiring a relatively large supply of chemical reagents and expert knowledge of and accuracy in their use.

The foregoing objects of my invention and the principles thereof will more fully appear in the following detailed description of the invention and specific examples thereof as applied to the production of a potable water from sea water in fulfillment of the above stated particular object of the invention. It is to be understood, however, that while the invention is particularly applicable to and finds its greatest usefulness in the production of a potable water from sea water under the emergency conditions briefly outlined above, it is not limited to that particular use or those particular conditions of use, but may be usefully employed in the production of potable water from non-potable saline waters generally. Hence, the following description and specific examples of practice of the invention in the production of a potable water from sea water under the stated emergency conditions, are to be taken as illustrating and not as limiting the invention.

Referring further to the conditions which must be and are met by the method of my invention as applied to the treatment of sea water in fulfillment of the hereinbefore stated particular object of that invention:

(1) The treatment must not only render the sea water potable by de-salination of its originally contained salts responsible for its non-potability, but the treatment must also not develop toxic properties in the de-salinated water.

(2) The treatment must be such as to leave the finally treated and potable water with an osmotic pressure of a sufficiently low order to enable diffusion of that water through the intestinal membranes of the consumer into the blood stream.

(3) The treatment must be applicable with a minimum of equipment, preferably without special containers, and without the application of heat, and preferably without the necessity of a filtration step.

(4) The required chemicals should be a minimum as to weight and bulk, preferably in mass weight not more than 10 per cent of the mass of the sea water to be treated, and definitely less than 20 per cent.

(5) The chemicals employed should be of a permanent nature in the sense of not readily deteriorating or changing from their original chemical properties under atmospheric or other conditions to which they are normally subjected prior to actual use.

(6) The treatment should not require accurate determination, by titrations or otherwise, of the quantities of solvent water in the mass of sea water undergoing the treatment, or of its saline solutes responsible for the non-potability of the water, or of the reagents used for the required de-salination. In particular, the treatment should permit the use of an appreciable excess of the de-salinating reagent over the optimum quantity or any prescribed exact quantity without spoiling the result in the production of a potable water, since the process must be performable without exact measurement of the quantity of the reagent used.

(7) In view of some appreciable variation of salinity between different oceans, such, for example, as the Baltic Sea and the Red Sea, a variation in the minimum quantity of the chemical reagent for the required de-salination of the sea water by a factor of 2 should be provided for.

(8) The duration of the treatment for its completion in the production of a potable water should not exceed three to four hours and may preferably be of even shorter duration.

(9) In view of the emergency nature of the treatment the cost of the chemicals used is not of substantial importance.

While, as stated above, there is some quite appreciable variation in the degrees of salinity of different oceans, according to authoritative published analyses that variation is within such limits as to present the total content of salts in sea water as from 2 to 4 per cent by weight of the total weight of the entire mass of solvent water and solutes, with an average for the great oceans about 3.5 per cent. The main constituents of the solutes are as given in the following table in their respective percentage weights relative to the total weight of all the solutes:

| | |
|---|---|
| Sodium chloride, NaCl | 77.8 |
| Magnesium chloride, $MgCl_2$ | 10.9 |
| Magnesium sulfate, $MgSO_4$ | 4.7 |
| Calcium sulfate, $CaSO_4$ | 3.6 |
| Potassium sulfate, $K_2SO_4$ | 2.5 |
| Calcium carbonate, $CaCO_3$ | 0.3 |
| Minor constituents | 0.2 |
| | 100.0 |

From the foregoing table, it is apparent that the two major constituents of sea water salts are the sodium chloride and the magnesium chloride; and they are chiefly responsible for the non-potability of that water. That is so not only because those salts are present in substantial amounts but also because they are in a dissociated solution state in the sea water with respect to the sodium cation of the sodium chloride, the magnesium cation of the magnesium chloride and the chlorine anion of each; and in that state, and in the substantial amounts presented, those salts, or their respective cations or anions, are not physiologically tolerable in the human system. Hence, the de-salination of the sea water with respect to those salts is essential to the attainment of the object of the invention in the production of a potable water.

The three next listed salts of the foregoing table, the sulfates of magnesium, calcium and potassium, are also in a dissociated solution state in the sea water with respect to their cations magnesium, calcium and potassium and the sulfate anion of each. But, in their decidedly minor amounts, those salts are sufficiently physiologically tolerable in the human system that the de-salination of the sea water with respect to them is not essential for the transformation of sea water to a potable water, and that is especially so for the hereinbefore stated emergency use of the process. However, such desalination has certain advantages and is included in certain practices of my invention as hereinafter described. For example, when such de-salination is not employed in the practice of the invention, the finally produced water presents a substantial degree of hardness due in part to the calcium sulfate, and some degree of laxative effect due principally to the magnesium sulfate and to a lesser extent to the potassium sulfate. But none of those properties appear in sufficiently high degree to render the water impossible or even distinctly unsatisfactory as a potable water either in taste or physiological effect.

Also the hardness imparted to the finally treated water by the calcium carbonate listed in the foregoing table of sea water salts is obviously of so little importance as to require no de-salination of the sea water so far as that salt is concerned.

For the de-salination of sea water in respect to the sodium chloride and magnesium chloride, the invention comprises the addition to that water of a reagent compound of silver, which may be either a silver salt exhibiting a substantial degree of solubility and tendency to dissociate when added to the sea water or an oxide of silver. In either case, however, the silver compound should be one capable of reacting with the mentioned chlorides in the sea water to form the substantially insoluble silver chloride and an insoluble compound of magnesium, for the removal of the chlorine anion and the magnesium cation in the precipitates, and form a soluble compound of sodium which, if physiologically intolerable, may be transformed into a physiologically tolerable salt in the hereinafter described subsequent step of adding a weak organic acid. Among such salts, I preferably employ silver carbonate $Ag_2CO_3$ and for the oxide I preferably employ silver oxide $Ag_2O$. The latter has substantial advantages over the former, primarily because of its lighter weight and the relative instability of the carbonate which tends to decompose in the presence of moisture into the oxide, $Ag_2O$, and carbon dioxide.

The silver oxide, $Ag_2O$, as such in the dry state in the form of a fine powder, may be added to a collected body of sea water of suitable mass for the treatment such, for example, as 2000 cc., and uniformly dispersed therein by stirring, agitation or any other suitable means. Alternatively, and as an extremely convenient mode of use of that reagent, a colloidal dispersion of silver oxide in ordinary non-saline water in the form of a paste may be prepared and added to the collected body of sea water, as such a paste disperses very readily and substantially uniformly throughout the body of the sea water.

When the paste is added in the prescribed or roughly estimated quantity to the collected body of sea water, the reactions effecting the de-salination of that water in respect to the sodium chloride and the magnesium chloride may be represented by the following equation:

$$2Ag_2O + 2NaCl + MgCl_2 + 2H_2O = 4AgCl + 2NaOH + Mg(OH)_2$$

Or, to more precisely represent the generally accepted view that in the presence of water the silver oxide, $Ag_2O$, acts as an hydroxide or hydrous silver oxide, the reactions may be represented by the following equation:

$$3AgOH + NaCl + MgCl_2 = 3AgCl + NaOH + Mg(OH)_2$$

Substantially all of the formed silver chloride readily precipitates since its solubility is exceedingly small (about $10^{-7}$ mol.) even if some slight excess of the chlorine anion should remain in the water undergoing the treatment. As the formed magnesium hydroxide is practically insoluble in water, it also is precipitated and simultaneously with the silver chloride. Hence, by the further step of separating the supernatants from the precipitates, either by filtration or decanting off the supernatants, the body of sea water undergoing the treatment is freed substantially entirely of the originally contained magnesium chloride and from the physiologically intolerable chlorine anion of its originally contained sodium chloride. The only remnant of those salts in any substantial quantity then remaining in solution in the thus treated sea water is the sodium cation of the originally contained sodium chloride which is now combined with the hydroxyl anion as sodium hydroxide; and since the sodium cation and the hydroxyl anion in the dissociated state of that hydroxide in solution in water are toxic in their effects, the sea water must be further treated for the final production of potable water.

While the sodium cation of the sodium hydroxide may be removed from the sea water by any suitable chemical reagent reacting with the sodium hydroxide to form an insoluble and precipitating sodium compound, contrary to the before described precipitation of the magnesium such precipitation of the sodium results in the replacement of the sodium hydroxide with still another soluble compound having a toxic component and therefore requiring still further process steps for its removal. Hence, the process of my invention preferably employs the more direct procedure of retaining the sodium in the water undergoing the treatment but replacing the toxic hydroxyl anion of the sodium hydroxide with an anion which is physiologically tolerable when associated with the sodium in the newly formed compound and in which compound the sodium is also physiologically tolerable, as in certain soluble salts of sodium which have but little tendency to dissociate.

The anion of any one of a number of weak organic acids is suitable as a physiologically tolerable or non-toxic anion to replace the hydroxyl of the sodium hydroxide, such as the hydrous succinic acids, more particularly hydroxysuccinic acid or malic acid and dihydroxysuccinic acid or tartaric acid; also lactic acid and citric acid. Those enumerated acids are only examples of weak organic acids with non-toxic and palatable ions which may be used. However, another consideration obtains which renders the acid with the anion or acid radical of highest valence the most preferable although not necessarily the only suitable one which may be used. The reason for that preference is as follows:

As hereinbefore stated, the treatment of the sea water must be such as to leave the finally produced potable water with an osmotic pressure of a sufficiently low order to enable diffusion of that water through the intestinal membranes of the consumer into the blood stream. According to the laws governing the osmotic pressure of aqueous solutions, that pressure varies directly with the number of molecules of the solute, and the solvent liquid diffuses through the membrane from the side of lowest concentration of solutes or lowest osmotic pressure to the side of highest concentration of solutes or highest osmotic pressure. Hence, the number of molecules of the solute in the consumed solvent water should be at a minimum in order to produce a minimum osmotic pressure for a maximum diffusion of that water through the intestinal membranes of the consumer into the blood stream. And, finally, with respect to the soluble non-toxic salt of sodium to be formed, the number of molecules of that salt in solution will be at a minimum for the maximum number of sodium cations which can be bound by the anion or acid radical of the selected acid. Hence, the anion or acid radical of the highest valence is preferable, which, of course, points to the citric acid as the most preferable one of the above listed acids. However, in some cases it may be advantageous to include with the citric acid a very minor amount of malic acid.

An aqueous solution of citric acid of high concentration is used, and when added to the sea water containing the sodium hydroxide in solution as a result of the last preceding treatment, the reaction is as represented by the equation $$3NaOH + H_3C_6H_5O_7 = Na_3C_6H_5O_7 + 3H_2O$$

The thus-far treated sea water has had its major salts, sodium chloride and magnesium chloride, removed; and, aside from the other salts of the foregoing table which are present in such minor amounts as not to necessarily require removal, the water contains sodium citrate as its chief constituent in but very slightly dissociated state and with no appreciable taste or toxic effect.

The successful performance of the process is facilitated by a substantially complete neutralization of the sodium hydroxide by the employed acid (e. g. citric acid). However, even with that neutralization of the sodium hydroxide, the high concentration of the resulting sodium citrate renders a slight excess of free (citric) acid desirable in order to overcome an alkaline taste of the treated water. Hence, some mode of determining when a state of substantially complete neutralization of the sodium hydroxide and the desired excess of free acid have been attained, is desirable. But it is not essential that a titration or like procedural step be incorporated in the process; for a harmless mere sipping taste of the water to which the acid is added may be used as a sufficient guide for the addition of the acid in sufficient amount for substantially complete neutralization of the sodium hydroxide and sufficient reduction of the alkaline taste to render the water acceptable as a potable water.

However my invention may also advantageously be practiced with an additional procedural step incorporated therein by way of an adjustment of the hydrogen ion concentration of the water. Experiments have shown that in the case of sodium citrate the most pleasant and least alkaline taste of the water is reached at a pH of the approximate order of 5.8, and that a potable water having that pH may be attained by adjusting the concentration of the citrate through adjustment of the amount of the citric acid added to the water. To accomplish that optimum concentration of the citrate to produce the most palatable potable water, any one of the well known indicators may be used which exhibits a distinctly observable color change in the 5.8 region of the pH, such, for example, as dibromothymolsulfonphthalein or dinitrobenzoyleneurea. The first of those indicators is preferably employed, mainly because it shifts in color from blue to yellow in the 5.8 region of the pH, and blue-yellow color blindness is almost unknown, whereas the second of the two last-mentioned indicators shifts from yellow to white, and a lack of eye sensitivity to yellow is sometimes encountered. Only a trace of any one of the above indicators is needed; and while the selected indicator may be separately added to the water undergoing the treatment, for greater convenience of its use it may be admixed with the hereinbefore mentioned citric acid or it may be applied to a separate carrier material, such as paper, cloth and the like, attached to the container of the citric acid and added to the water as the citric acid is added. If any other of the above mentioned acids than citric acid is used to form a sodium salt with the anion of the acid, the optimum potability of the water in respect to taste and alkalinity is attained at other pH values different for each acid used. The operating principles are, however, the same as indicated above in the use of the citric acid.

As hereinbefore stated, the process is not rendered ineffective in the production of a potable water if the silver oxide as such in the dry state in fine powder form or as a paste formed initially of silver oxide and non-saline water has been added to the sea water in excess of that required for the first reaction step of the process in the precipitation of silver chloride and magnesium hydroxide and formation of the soluble sodium hydroxide and magnesium hydroxide from the sodium and magnesium chlorides originally contained in the sea water. In either case, the basic nature of the hydrous silver oxide, which appears to be in effect the form in which the silver oxide functions in the presence of water, causes the formation of silver citrate with the subsequently added citric acid and reduction of the hydrogen ion concentration of the water until substantially all the excess of the silver oxide or hydrous silver oxide has been transformed into silver citrate. As the thus formed silver citrate is of very low solubility, it readily precipitates and is readily removed from the treated water as in the case of the previously mentioned precipitates. Hence the process presents no substantial possibility of producing a toxic effect from the silver or any of its formed compounds or even an objectional concentration of a silver cation in the treated water.

In the foregoing practices of my invention, the ratio between the mass weight of the chemicals employed and the mass weight of a suitable body of the sea water to be treated may be as low as from about 1 to 10 for sea water of the salinity of the Atlantic and Pacific Oceans.

The reagents and indicator substance may, with advantage, be packed in only two separate and relatively small containers: one for the previously prepared fine, dry powder of silver oxide or the paste of silver oxide and water, in which latter case the container may advantageously be a collapsible tube for extrusion of the pasty material; and the other for a previously prepared quantity of the hereinbefore mentioned citric or other weak organic acid in dry (powderous) condition or in aqueous solution. As hereinbefore stated, it is not essential to the production of a potable water that the hydrogen ion concentration of the produced water be adjusted for palatability and hence it is not essential that an indicator be used. But if such an adjustment is desired, the required very small quantity of the indicator material may be added to the aqueous solution of the organic acid in the second container or to the dry (powderous) acid in any one of the hereinbefore mentioned modes of use of the acid and the indicator.

Also, and of further advantage for the hereinbefore mentioned emergency production of a potable water from sea water, the process of the invention requires only a few procedural steps, (1) the addition of the silver compound in the form of the above-described dry powder, paste, or otherwise, (2) the addition of the weak organic acid to the supernatant water; and (3) the separation of the supernatant water from the precipitates, either by filtration or decantation, for which, in practically all cases, some form of equipment is available or may readily be improvised from available material, and especially so as to the procedure of separating the supernatant water from the precipitates. This separation of the supernatant water from all the precipitates may be postponed until after step (2) but it is decidedly more beneficial to separate the supernatant water from the precipitates formed in step (1) before proceeding to step (2).

The process may also be carried out in principle substantially as described above with the use of silver carbonate instead of the silver oxide or hydrous silver oxide, although somewhat less advantageously as hereinbefore stated. In the use of the silver carbonate reagent, followed by the citric acid as the preferred weak organic acid, the reactions are analogous to those described above. In the reactions of the silver carbonate with the chlorides of sodium and magnesium in the sea water, the substantially insoluble silver chloride and magnesium carbonate and the soluble sodium carbonate are formed. The supernatant water containing the sodium carbonate is separated from the precipitates and treated with a weak organic acid, preferably citric acid, as before, and the sodium carbonate thereby transformed to sodium citrate with evolution of free carbon dioxide.

As hereinbefore pointed out, the additional desalination of the sea water in respect to the sulfates of magnesium, calcium and potassium is not essential to all useful embodiments or practices of my invention in the production of a potable water. In particular that additional desalination is not essential to or of any great importance in the emergency production of a potable water from sea water in cases of shipwreck. However, that additional de-salination is included as a feature of the invention in certain of its embodiments or practices for the additional advantage derived therefrom.

For that de-salination, my invention comprises the employment of an hydrous oxide or hydroxide of any base element which will react with the respective sulfates of the sea water to form an insoluble sulfate of the base element, the insoluble hydroxide of magnesium and the soluble hydroxides of sodium and potassium. Thus, when that is followed by filtration or other mode of separation of the supernatant water from the precipitates, the sea water is freed from the SO₄ anion of each of its originally contained sulfates and from the magnesium cation of its originally contained magnesium sulfate. The soluble hydroxides of calcium and potassium which remain in the water undergoing the treatment may then be transformed into citrates or other salts of weak organic acids after the manner already described in respect to sodium hydroxide.

For the foregoing additional de-salination of the sea water I preferably employ barium as the basic element of the hydrous de-salinating reagent; and for convenience of its use the barium hydroxide may be incorporated into the hydrous paste made from silver oxide and water. When the barium hydroxide either separately or in the composite paste is added to the sea water, the occurring reaction of that reagent with magnesium sulfate is as represented in the equation

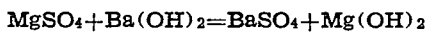

Both of the indicated resulting components are practically insoluble and readily precipitate.

In analogous reactions of the barium hydroxide with the sulfates of calcium and potassium, the insoluble barium sulfate and the soluble hydroxides of calcium and potassium are formed. Those soluble and toxic hydroxides are then transformed into the soluble potassium citrate and the only very slightly soluble calcium citrate by the addition of citric acid after the hereinbefore described manner of transformation of the sodium hydroxide into sodium citrate. Not only are both of the thus formed calcium and potassium citrates non-toxic in solution in the finally treated water, but both occur in such slight concentrations as to be physiologically unimportant in any event.

Substantially the only precaution required in the foregoing use of barium hydroxide is to avoid any appreciable excess of free barium, on account of its severe toxic properties. But the use of any such excess may be readily guarded against by incorporating the barium hydroxide into the silver oxide and water paste in an amount which, as the paste is used for its silver oxide content, supplies the barium hydroxide in appreciably less amount than its exact stoechiometric relationship with the SO₄ anion of the sulfates in the sea water requires for complete reaction in the formation of barium sulfate and hence complete removal of the SO₄ anion from the treated water. In other words, the sulfates of magnesium, calcium and potassium occur in minor and relatively unimportant concentrations in the sea water in any event, and while there is some advantage in the removal of the sulfate anion, substantial realization of that advantage does not necessarily require complete removal of the sulfate anion.

What I claim is:

1. A process for the production of potable water from saline waters which are non-potable due to contained sodium chloride and magnesium chloride in sufficient amounts to be toxic to the human system on consumption of said water, said process comprising dispersing in a body of said saline water in a suitable container a sufficient quantity of a compound of silver selected from the group consisting of silver oxide and silver carbonate to effect reactions with said chloride solutes in said saline water with resulting formation of precipitates containing substantially all the chlorine and magnesium of said sodium and magnesium chlorides originally contained in said body of saline water and formation of a sodium hydroxide solute in said body of water when silver oxide is the selected and dispersed silver compound and a sodium carbonate solute in said body of water when silver carbonate is the selected and dispersed silver compound, adding to the supernatant water containing one of said last-mentioned solutes a sufficient amount of a non-toxic, weak organic acid capable of reacting with either of said sodium hydroxide and sodium carbonate solutes to form a non-toxic sodium salt of said acid, and separating the formed precipitates from the supernatant water in any desired order during the performance of the process.

2. A process as defined in claim 1 and further characterized by employing silver oxide as the selected compound of silver.

3. A process as defined in claim 1 and further characterized by employing silver carbonate as said selected compound of silver.

4. A process for the production of potable water from sea water, said process comprising dispersing a sufficient quantity of silver oxide in the form of fine, solid particles in a collected body of sea water in a suitable container to effect reaction of the silver oxide with the chloride solutes in said body of sea water with resulting formation of a sodium hydroxide solute in said body of water and precipitates of silver chloride and magnesium hydroxide containing substantially all of the chlorine and magnesium of the sodium and magnesium chlorides originally contained in said collected body of sea water, adding to the supernatant water containing said sodium hydroxide solute a sufficient amount of a non-toxic, weak organic acid capable of reacting with said sodium hydroxide to form a non-toxic sodium salt of said acid and thereby neutralize the toxic sodium hydroxide, and separating the formed precipitates from the supernatant water in any desired order during the performance of the process.

5. A process as defined in claim 4 and further characterized by employing as said non-toxic, weak organic acid such an acid containing a carbonyl group.

6. A process as defined in claim 4 and further characterized by employing as said non-toxic, weak organic acid such an acid containing a carboxyl group.

7. A process as defined in claim 4 and further characterized by employing citric acid as said non-toxic, weak organic acid.

8. A process as defined in claim 4 and further characterized by separating said precipitates of silver chloride and magnesium hydroxide from the supernatant liquid containing said sodium hydroxide solute before adding said non-toxic, weak organic acid to said supernatant liquid.

9. A process as defined in claim 4 and further characterized by employing said silver oxide in the form of a dry powder for said dispersion of the silver oxide in said collected body of sea water.

10. A process as defined in claim 4 and further characterized by employing said silver oxide intermixed with water as a paste for said dispersion of the silver oxide in said collected body of sea water.

11. A process for the production of potable water from sea water, said process comprising dispersing a sufficient quantity of silver oxide in the form of fine, solid particles in a collected body of sea water in a suitable container to effect reactions of the silver oxide with the chloride solutes in said body of sea water with resulting formation of a sodium hydroxide solute in said body of water and precipitates of silver chloride and magnesium hydroxide containing substantially all of the chlorine and magnesium of the sodium and magnesium chlorides originally contained in said collected body of sea water, separating said precipitates from the supernatant water containing said formed sodium hydroxide, and adding to said supernatant water a sufficient amount of a non-toxic, weak organic acid capable of reacting with said sodium hydroxide to form a water-soluble and non-toxic sodium salt of said acid.

12. A process for the production of potable water from sea water, said process comprising dispersing a sufficient quantity of silver oxide in the form of fine, solid particles in a collected body of sea water in a suitable container to effect reactions of the silver oxide with the chloride solutes in said body of sea water with resulting formation of a sodium hydroxide solute in said body of water and precipitates of silver chloride and magnesium hydroxide containing substantially all of the chlorine and magnesium of the sodium and magnesium chlorides originally contained in said collected body of sea water, also dispersing in said collected body of sea water a hydrous oxide of barium in sufficient quantity to effect reactions with the magnesium sulfate, calcium sulfate and potassium sulfate solutes in said body of sea water with resulting formation of calcium hydroxide and potassium hydroxide solutes in said water and precipitates of magnesium hydroxide and barium sulfate containing substantially all the magnesium and at least the major proportion of the acid anion of the said sulfate solutes originally contained in said collected body of water, adding to the supernatant water containing said sodium, calcium and potassium hydroxide solutes a sufficient amount of a non-toxic, weak organic acid capable of reacting with said hydroxide solutes to form non-toxic sodium, calcium and potassium salts of said acid, and separating the formed precipitates from the supernatant water in any desired order during the performance of the process.

13. A process as defined in claim 12 and further characterized by separating said precipitates of silver chloride, magnesium hydroxide and barium sulfate from the supernatant water containing said sodium, calcium and potassium hydroxide solutes before adding said organic acid to said supernatant water and employing as said acid one forming water-soluble and non-toxic sodium, potassium and calcium salts.

14. A process as defined in claim 12 and further characterized by separating said precipitates of silver chloride, magnesium hydroxide and barium sulfate from the supernatant water containing said sodium, calcium and potassium hydroxide solutes before adding said organic acid to said supernatant water and employing as said acid citric acid in an amount forming sodium, potassium and calcium citrates.

15. A process as defined in claim 11 and further characterized by adding said organic acid to said water containing said sodium hydroxide in sufficient excess over that required for said reaction with said sodium hydroxide in formation of said sodium salt to supply said water with free said organic acid.

16. A process as defined in claim 11 and further characterized by adding said organic acid to said water containing said sodium hydroxide in sufficient amount to deprive said water of an appreciable alkaline taste.

17. A process as defined in claim 11 and further characterized by dispersing in said water containing said sodium hydroxide a color-changing pH indicator substance having the property of changing color when said organic acid has been added to said water in sufficient excess over the amount required for substantially complete neutralization of said sodium hydroxide to reach into the relatively narrow pH range characteristic of optimum palatability of said water, and adding said organic acid to said water in the presence of said dispersed indicator substance until said indicator substance exhibits said change in color.

18. A process as defined in claim 11 and further characterized by employing citric acid as said weak organic acid, dispersing in said water a dispersable color-changing pH indicator substance presenting a definite color change for citric acid when the pH of said water reaches a value of the order of about 5.8 as said acid is added, and adding said citric acid to said water in the presence of said dispersed indicator substance until said definite color change appears and then discontinuing the addition of said acid.

ALEXANDER GOETZ.